March 21, 1961 G. H. BUSHWAY 2,975,527
ROASTING MACHINE
Filed July 1, 1957 4 Sheets-Sheet 1

Inventor:
George H. Bushway,
by Kenway, Jenney, Witter & Hildreth
Attorneys

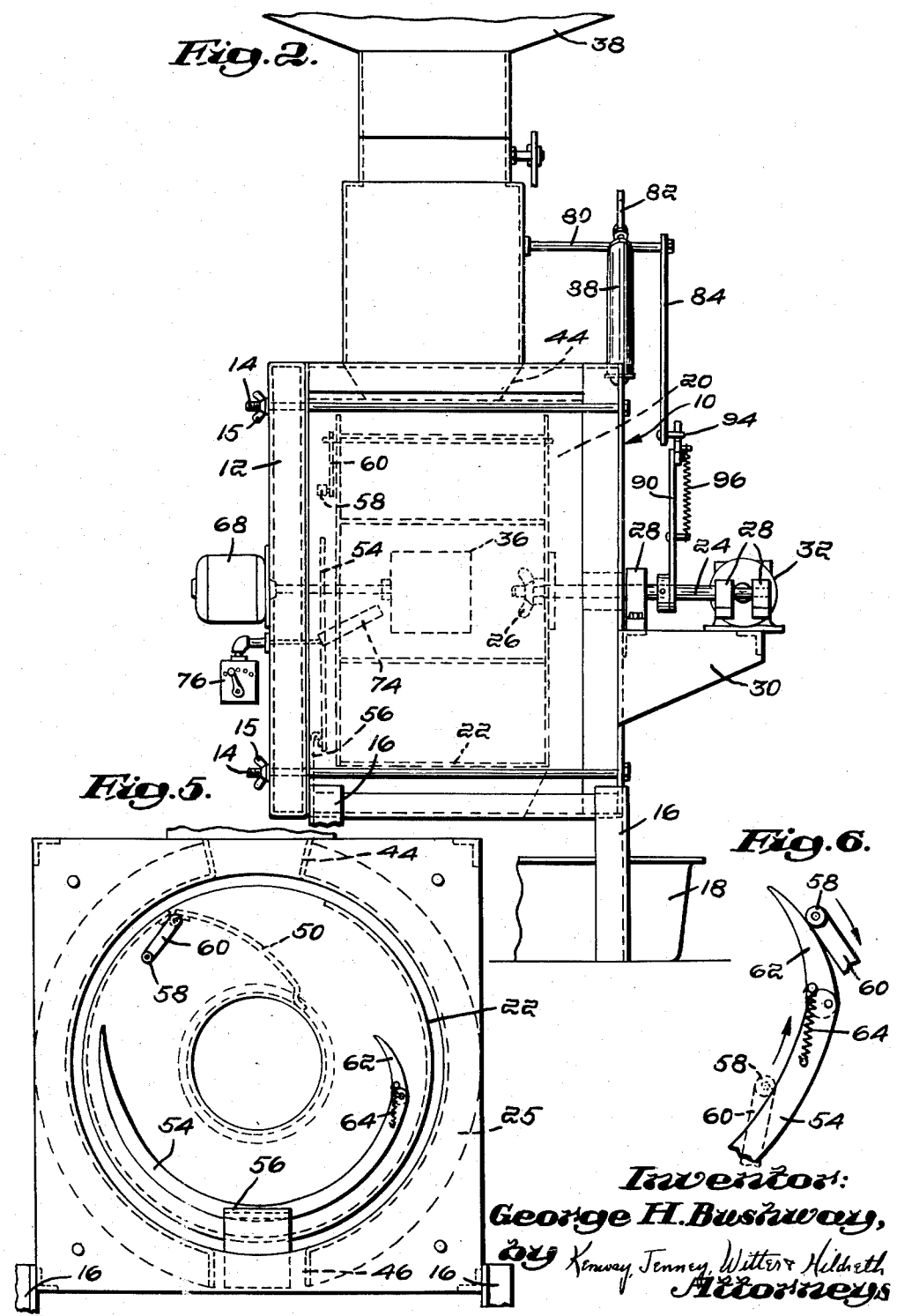

March 21, 1961 G. H. BUSHWAY 2,975,527
ROASTING MACHINE
Filed July 1, 1957 4 Sheets-Sheet 3
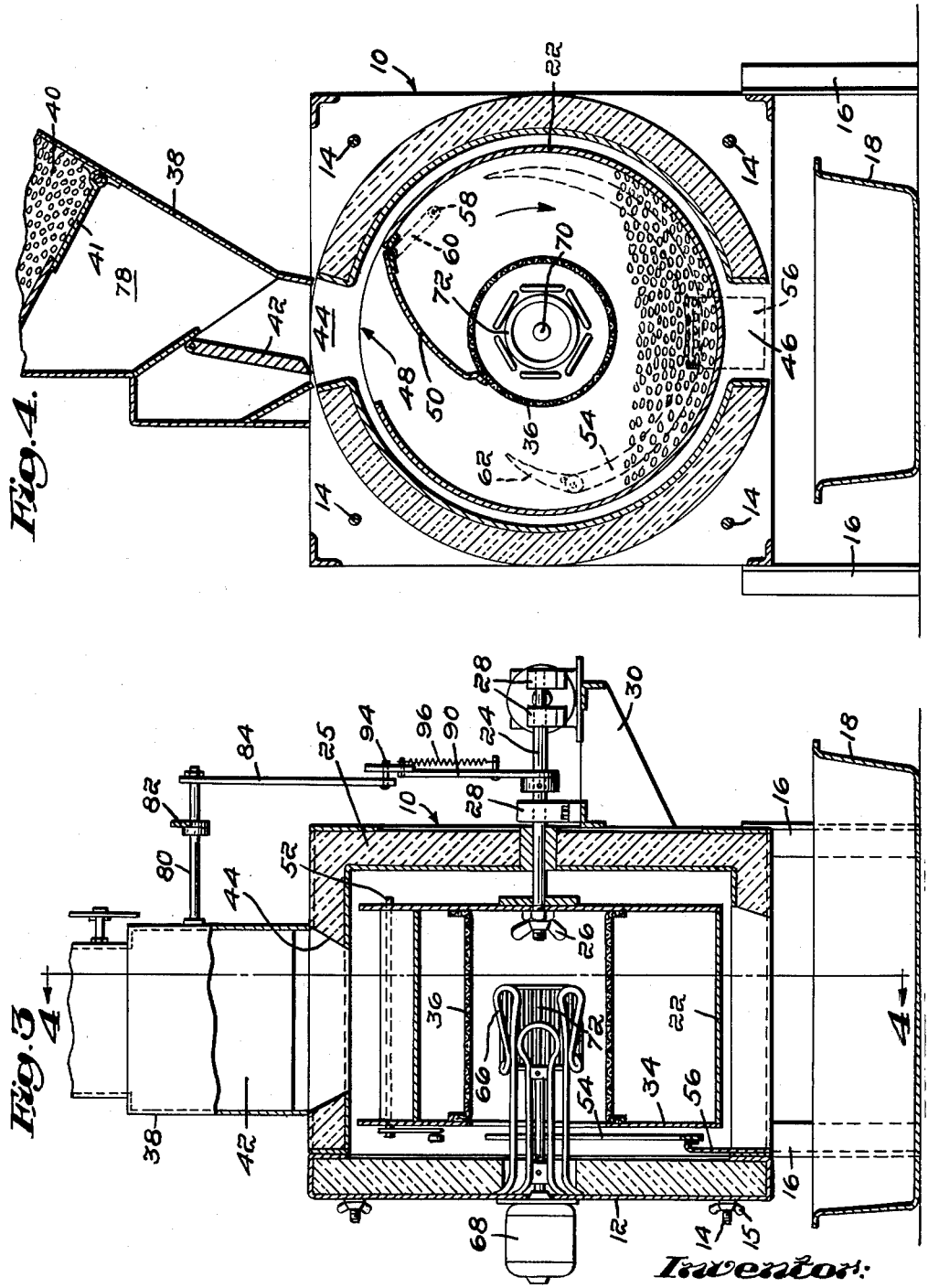

March 21, 1961 G. H. BUSHWAY 2,975,527
ROASTING MACHINE
Filed July 1, 1957 4 Sheets-Sheet 4
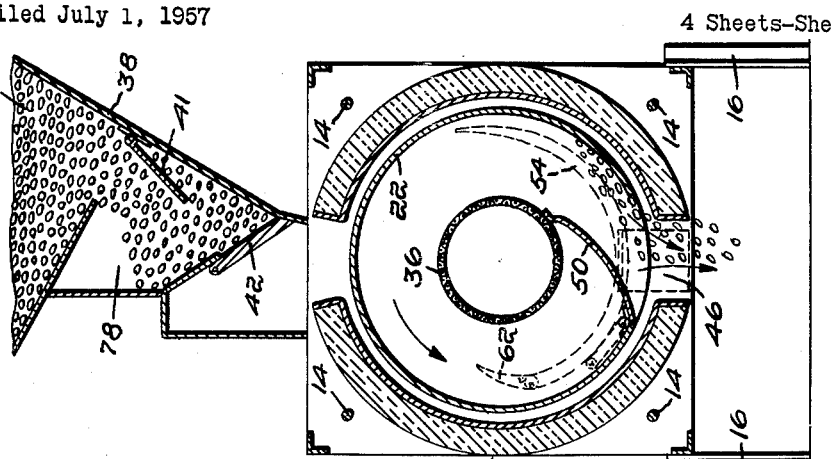
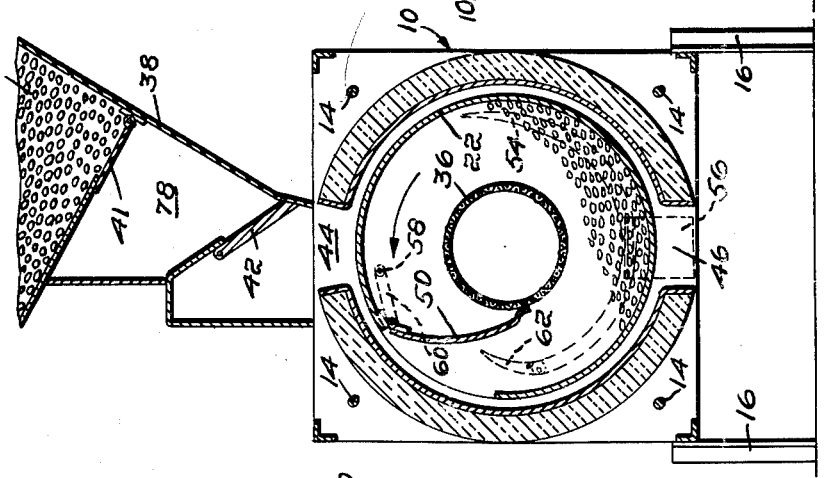
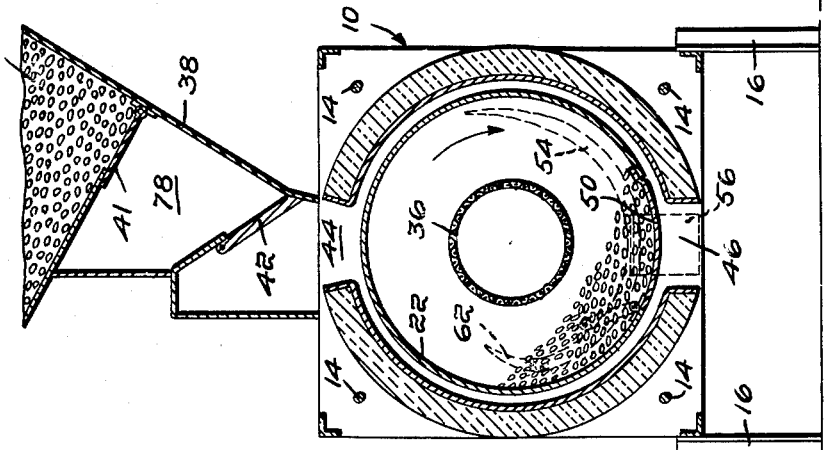
Inventor:
George H. Bushway
by Kenway, Jenney, Witter & Hildreth
Attorneys

2,975,527
ROASTING MACHINE

George H. Bushway, 20 South Road, Rye Beach, N.H.

Filed July 1, 1957, Ser. No. 669,282

8 Claims. (Cl. 34—87)

This invention relates to a cooking or roasting machine of the nature shown in United States Patent 2,522,448, dated September 12, 1950, and wherein the cooking of a product is effected within a closed chamber by a gaseous medium, preferably air, continuously circulated in an endless path within the chamber and through the product therein while providing additional heat to the cooking medium. The product is agitated with a rotary drum during the cooking operation and the object of the present invention resides primarily in the production of an improved construction including the locating of the heating and air circulating means compactly within the drum, thereby simplifying the mechanism and rendering it more efficient.

The machine is entirely automatic and is adapted continuously and successively to (1) discharge into the drum measured batches of the product to be cooked, (2) cook each such batch to a predetermined degree and (3) discharge the cooked batches from the drum. As described in the said patent, the operations are performed consecutively under the control of a thermostat disposed in or adjacent to the cooking medium and arranged automatically to provide predetermined heat to the cooking medium, to discharge each cooked batch after predetermined cooking and to place a new batch in the drum following each discharging operation. The invention herein resides primarily in the novel and more compact arrangement of the drum and associated cooking mechanism within the chamber, the transferring of the batches of product to and from the drum and chamber and the automatic controlling thereof and of the cooking operations being substantially as described in the patent.

These and other features of the invention are hereinafter specifically described and illustrated in the accompanying drawings in which—

Fig. 2 is a side elevation thereof,

Fig. 3 is a like view partly in vertical section,

Figure 1:
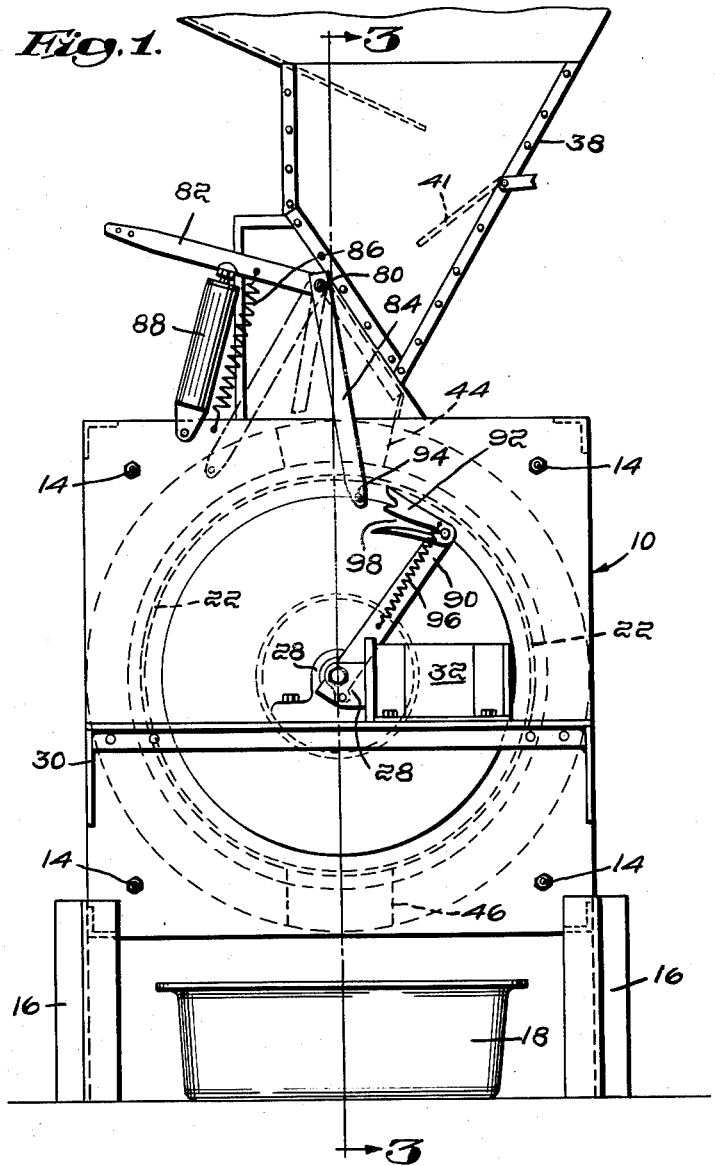
Fig. 1 is a front elevation of a cooking machine embodying the invention.

Fig. 4 is a sectional view taken on line 4—4 of Fig. 3 and showing a product batch being roasted within the drum, Fig. 5 is a rear elevation with the end closure plate of the drum removed, Fig. 6 is a an enlarged fragmentary view of Fig. 5, Fig. 7 is a vertical sectional view showing the drum in cooking rotation, Fig. 8 is a like view showing the drum in reverse rotation, and Fig. 9 is a like view showing a cooked batch being discharged from the drum.

In the drawings, 10 indicates a housing with insulated walls and including a removable end wall 12 adapted to be secured in place by clamping bolts and nuts 14 and 15. The housing is supported in elevated position on a frame including corner legs 16 and providing space beneath the housing for a removable container 18. The housing provides a roasting chamber 20 therein and disposed within the chamber for rotation on a horizontal axis is a drum 22. The drum is supported for such rotation on a shaft 24 extending through the front end wall 25 of the housing, the drum being secured to the shaft by clamping means including a nut 26. The outer portion of the shaft is supported in bearings 28 on a bracket 30 secured to the wall 25. Also carried on the bracket is drum rotating means including a reversible electric motor 32.

The drum can be of solid or foraminous construction. In the drawings I have illustrated the front end wall, the cylindrical wall and the outer portion 34 of the rear end wall as of sheet metal solid construction. The rear end of the drum is left open inwardly of the annular wall portion 34 and I preferably provide a cylindrical foraminous cage 36 disposed coaxially within the drum and secured at its ends to the end walls of the drum. The cage prevents any possible passage of the product into the heating chamber and is particularly useful when popping corn in the machine. The drum is spaced from all walls of the housing and the inner chamber wall of the housing opposed to the cylindrical wall of the drum is substantially concentric with and in slightly spaced relation from the cylindrical wall of the drum, as illustrated in Fig. 4.

Disposed on and above the housing is a hopper 38 for holding a quantity of nuts 40 or the like to be cooked and means including gates 41 and 42 for discharging measured batches of the product into the drum. The housing is provided with a charging opening 44 beneath the hopper and a discharging opening 46. The drum is also provided with an opening 48 through its cylindrical wall positioned to cooperate with the openings 44 and 46. A gate 50 secured to a shaft 52 pivoted at its ends in the ends walls of the drum is adapted in closed position to close the opening 48, the gate being pivotally movable inwardly to open position.

The drum is rotated in one direction (Fig. 7) during the roasting operation and in the other direction (Figs. 8 and 9) to discharge the cooked batch and take on a fresh charge from the hopper. The following means is provided for automatically opening and closing the gate 50 synchronously with these movements. A cam 54 supported on a bracket 56 secured to the housing wall 12 extends in a semicircular path within the chamber 20 outside one end of the lower portion of the drum. An anti-friction roller 58 on the free end of an arm 60 fixed to the shaft 52 is disposed to pass either inwardly or outwardly of the cam. The drum is rotated in the direction of the arrow (Fig. 4) during the roasting operation and the gate normally opens by gravity when passing above the cage 36. Upon continued rotation of the drum the roller contacts the inside of the cam which thereupon closes the gate (Fig. 7) and holds it in closed position during its passage through the product being roasted. Upon reverse rotation of the drum the roller contacts an arm 62 pivoted to one end of the cam and is directed thereby to the outside of the cam, thereby opening the gate and holding it open during the batch discharging operation (Fig. 9). A spring 64 normally holds the arm in the position of Fig. 6 but allows swinging movement of the arm to permit passing of the roller in the roasting direction (Fig. 4). Such positive opening and closing of the gate renders the machine more positive and efficient in operation.

The heat for performing the roasting operation is provided by electric heaters 66 carried on the removable wall 12 and extending into the drum and disposed about its axis of rotation as illustrated in Figs. 3 and 4. A motor 68 carried on the outer face of the wall 12 is provided with a shaft 70 extending inwardly of the drum along its axis of rotation and carrying a fan 72 thereon within the heaters 66. Rotation of the fan is adapted to circulate the chamber air outwardly past the heaters, through the cage 36 and into roasting contact with the product being agitated by the drum rotation. The operation of the machine, including the reversal of the drum, is automatically controlled by a thermostat 74 in association with a control box 76, all in the manner shown and described in said Patent 2,522,448.

When the machine is to be operated, the main switch (not shown) is closed, whereupon the motor 32 rotates the drum forwardly (Fig. 4), the heater 66 is energized and the motor 68 drives the fan 72. During such rotation of the drum the gate 41 is opened to permit a batch of nuts or the like to flow into the measuring chamber 78, the gate 41 being thereafter closed. When the temperature within the chamber reaches the predetermined cooking temperature for which the control 76 is set, the thermostat automatically reverses the drum rotation and the measured batch of nuts in the chamber 78 is deposited into the drum. The following mechanism performs this function.

The gate 42 is fixed to a shaft 80 carrying two arms 82 and 84 fixed thereto. A spring 86 attached to the housing 10 and arm 82 normally holds the gate in closed position, a dash pot 88 being provided for cushioning the closing action. An arm 90 fixed to the shaft 24 carries a latch 92 positioned to engage a pin 94 on the free end of the arm 84 and open the gate 42. The position of the arm 90 on the shaft 94 is such that the opening 48 in the drum is brought to the charging opening 44 simultaneously with the opening of the gate 42, whereupon the charge of nuts is deposited into the drum.

The latch 92 is pivoted to the arm 90 and is rotated 180° to reverse position as the arm passes the pin 94, a spring 96 being provided for holding the latch in either position. A slot 98 in the latch engages the pin and turns the latch back to the position of Fig. 1 upon reverse rotation of the drum, all as illustrated and described in said Patent 2,522,448.

The deposit of the batch of nuts into the drum quickly lowers the temperature therein whereupon the thermostat reverses the rotation of the drum to the cooking direction indicated in Fig. 7. The cooking or roasting operation thereupon proceeds, and continues until the predetermined temperature is again reached and at which temperature the roasting of the batch is completed. The thermostat thereupon reverses the drum rotation to the direction indicated in Figs. 8 and 9 whereupon the cam 54 open the gate 50 and the cooked batch is discharged as illustrated in Fig. 9. Following the discharging of the cooked batch the continued reverse rotation of the drum brings the opening 48 to the charging position 44 as a fresh batch is deposited into the drum and the cooking cycle is repeated.

Having thus disclosed my invention what I claim as new and desire to secure by Letters Patent is:

1. A cooking machine comprising a housing providing a chamber within insulated walls, a cylindrical drum having a cylindrical wall and mounted for rotation on a horizontal axis in the chamber, means providing charging and discharging openings through the chamber walls respectively above and below the drum, means providing a cooperating opening through the cylindrical wall of the drum, electric heating means disposed within the drum adjacent to and about said axis and in spaced relation from said cylindrical wall, means including a rotary fan within the heating means for circulating the chamber air in an endless path within the chamber and including in one portion thereof the movement of the air radially outwardly from said heating means within the drum, means for rotating the drum, and means for preventing escape through said drum opening of a product being cooked during rotation of the drum in the cooking direction.

2. The cooking machine defined in claim 1 in which said air circulating means comprises a rotary fan within the heating means, an end wall of said housing being removably mounted and supporting said heating means and fan thereon.

3. The cooking machine defined in claim 1 in which an end wall of said housing is removable and said rotary fan is supported on said end wall, and a motor supported on said end wall for rotating the fan.

4. The cooking machine defined in claim 3 in which said drum rotating means includes a shaft operatively connected to and extending coaxially of the drum through the other end wall of the housing.

5. The cooking machine defined in claim 4 in which said drum is supported on said shaft.

6. The cooking machine defined in claim 1 in which the last named means comprises a closure gate pivoted to the drum for movement outwardly to a closed position closing said opening and inwardly to open position, and means adapted to close the gate when the drum is rotated in one direction and to open the gate when the drum is rotated in the other direction.

7. The cooking machine defined in claim 6 in which said gate opening and closing means comprises a cam within the chamber outwardly of the drum and an element carried by the gate and disposed to contact the cam during rotation of the drum.

8. A cooking machine comprising a housing providing a chamber within insulated walls, a cylindrical drum having a cylindrical wall and mounted for rotation on a horizontal axis in the chamber, means providing charging and discharging openings through the chamber walls respectively above and below the drum, means providing a cooperating opening through the cylindrical wall of the drum, a cylindrical foraminous cage disposed coaxially within the drum in spaced relation from its cylindrical wall, electric heating means adjacent to and disposed about said axis within the cage, means rotatable about said axis within the heating means for circulating the chamber air in an endless path within the chamber and including in one portion thereof the movement of the air radially outward through said heating means and through the cage and drum, means for rotating the drum, and means for preventing escape through said drum opening of a product being cooked during rotation of the drum in the cooking direction.

References Cited in the file of this patent

UNITED STATES PATENTS

| 698,246 | Bennett | Apr. 22, 1902 |
| 750,535 | Goings | Jan. 26, 1904 |
| 1,012,293 | Talbutt | Dec. 19, 1911 |
| 1,762,309 | Roesen | June 10, 1930 |
| 2,129,673 | Burns | Sept. 13, 1938 |
| 2,137,376 | Altorfer | Nov. 22, 1948 |
| 2,522,448 | Husk et al. | Sept. 12, 1950 |
| 2,523,796 | Weeks | Sept. 26, 1950 |